United States Patent [19]
McWilliams

[11] 3,788,452
[45] Jan. 29, 1974

[54] BALANCED EXTENDIBLE MOBILE CONVEYOR

[76] Inventor: Joseph E. McWilliams, 1345 Canterbury Ln., Glenview, Ill. 60025

[22] Filed: July 27, 1972

[21] Appl. No.: 275,791

[52] U.S. Cl. ............................................. 198/139
[51] Int. Cl. .......................................... B65g 15/00
[58] Field of Search........................ 198/139; 108/93

[56] References Cited
UNITED STATES PATENTS

| 2,631,715 | 3/1953 | Vickers | 198/139 |
| 1,192,746 | 7/1916 | Brown | 108/93 |
| 3,228,516 | 1/1966 | Sheeham | 198/139 |
| 3,146,878 | 9/1964 | Long | 198/139 |

*Primary Examiner*—Richard E. Aegerter
*Attorney, Agent, or Firm*—Robert C. Brown, Jr. et al.

[57] ABSTRACT

A balanced extendible mobile conveyor comprising a wheeled frame having a pair of oppositely directed retractable frames at opposed ends thereof that are mounted and may be driven for balanced and synchronized extending and retracting movement inwardly and outwardly of the wheeled frame ends, a single conveyor belt trained over the top of slider beds defined by said wheeled and retractable frames and provided with slack take up and let out trailing means to automatically take up and let out belt slack as the retractable frames are moved inwardly and outwardly of the wheeled frame, and a reversable drive for driving the belt. The wheeled frame includes drive wheels for selectively driving and steering the wheeled frame between desired positions of operation.

5 Claims, 7 Drawing Figures

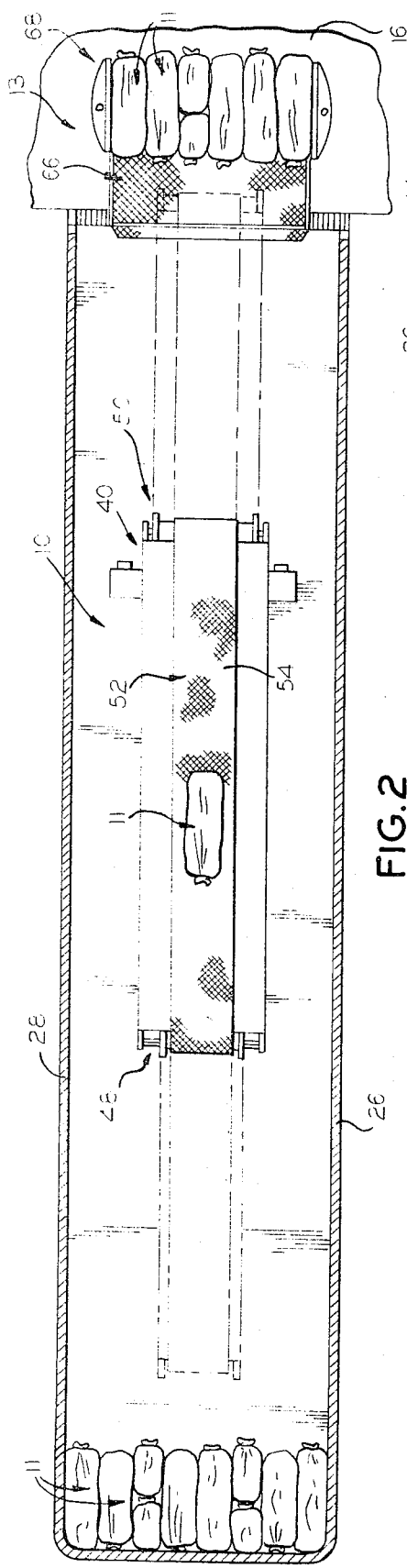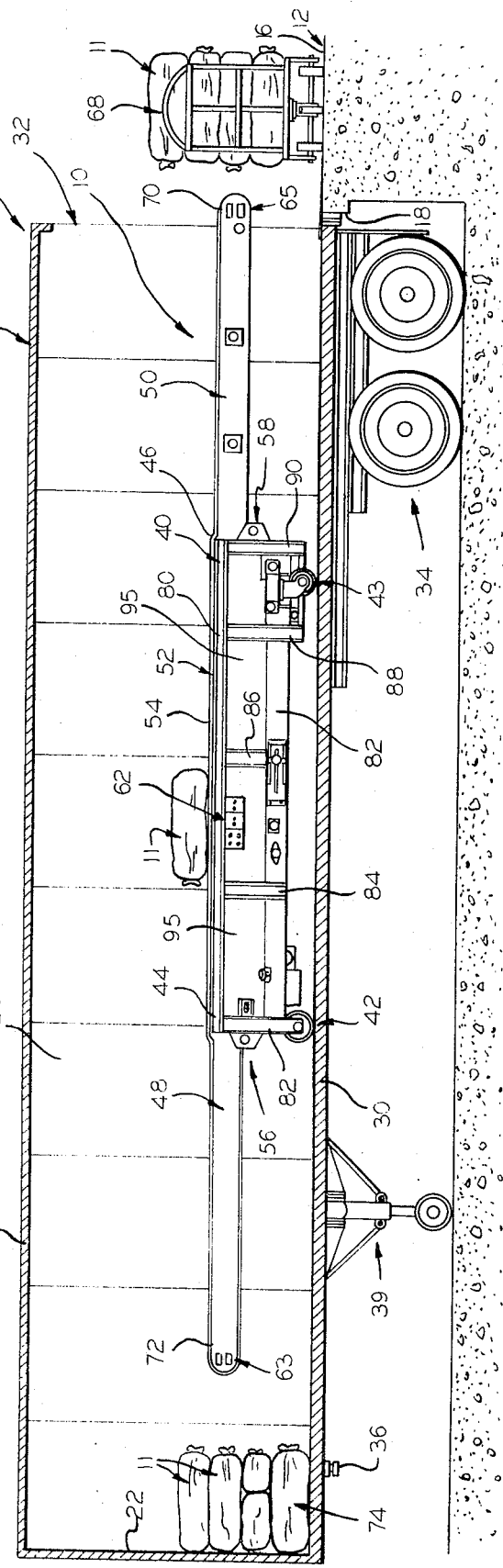

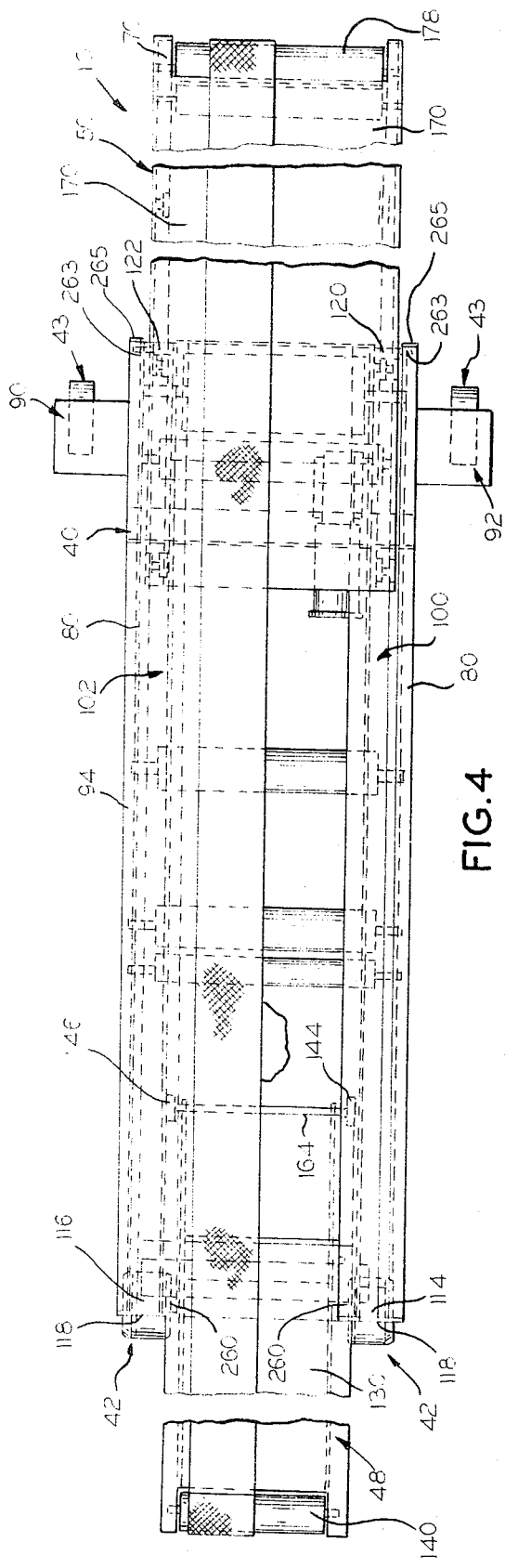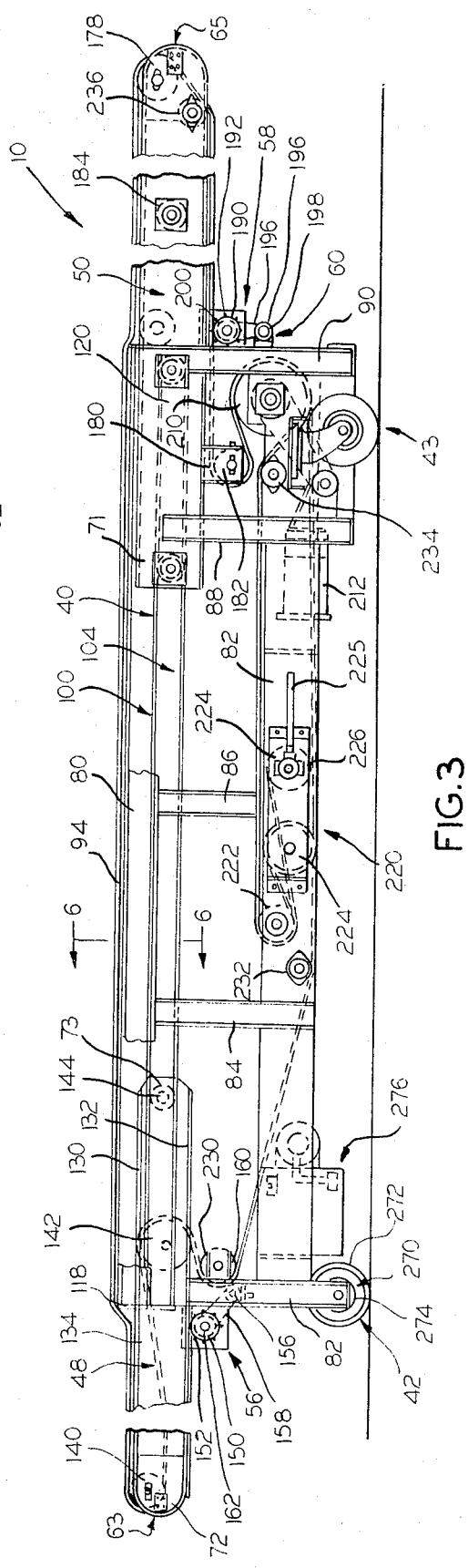

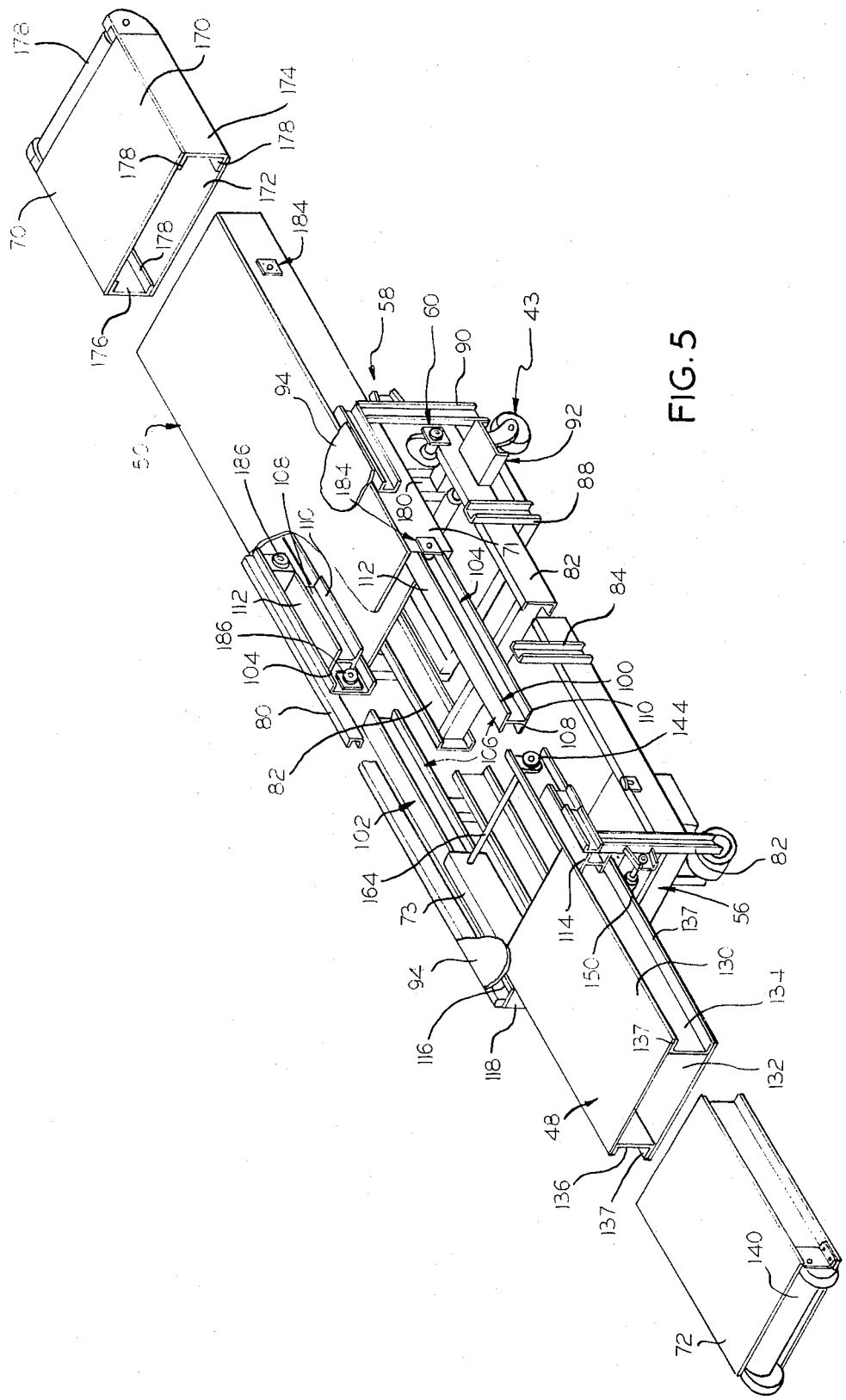

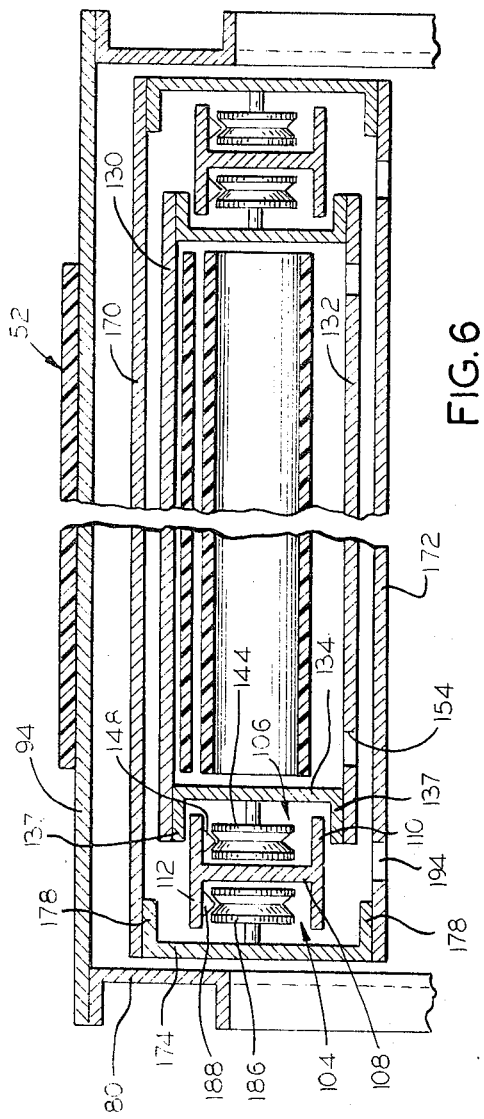

BALANCED EXTENDIBLE MOBILE CONVEYOR

This invention relates to a balanced extendible mobile conveyor, and more particularly, to a conveyor for handling bagged and packaged goods that has its opposite ends arranged for balanced extension and retraction to adjust the working length of the conveyor to suit varying needs.

Conveyor apparatus for unloading highway vehicles, such as semi-trailers and the like, from a loading dock present the difficulty that the items being handled must be moved from the loading dock into the vehicle over a distance that may sometimes be as much as 40 or more feet, depending on the length of the highway vehicle being loaded.

Where the conveyor is of the fixed type, this means that the conveyor frame must be firmly anchored cantilever fashion on the dock at a particular loading bay so as to project into the vehicle when the vehicle is backed into loading position at the bay, and, of course, it is not practical to attempt to move such a conveyor from one bay to another.

Where the conveyor is of the mobile type, the operating length it must have makes it awkward to handle, store, and shift between bays. While a considerable amount of work has been done in connection with providing conveyors of variable length, these usually comprise one or more frames operably associated with the main conveyor frame for extension and contraction from one end of the main frame. The resulting apparatus has usually proved to be awkward to handle, limited in application, and expensive to engineer and manufacture.

A principal object of this invention is to provide a conveyor apparatus that not only is mobile, but is extendible and contractible from either end of same in a balanced and synchronized manner to change the conveyor apparatus from a compact unit, when it is in its contracted relation, to a widely extended working unit for conveying loads distances approaching 40 feet.

Another principal object of the invention is to provide a balanced extendible mobile conveyor that is specifically adapted for loading mail bags from a loading dock into a highway vehicle that can be extended to have a working length on the order of 40 feet, and yet be contractible to a length of less than half that for ready transfer between bays and storage.

Other objects of the invention are to provide a conveyor arrangement that is extendible and retractable in a balanced synchronized manner from either end of same and employing a single conveyor belt trained for automatic slack take up and let out as required to accommodate change in conveyor length, to provide a mobile or portable extendible and contractible conveyor of general utility, and to provide a conveyor arrangement that is economical of manufacture, convenient to operate and shift between positions of use, and that is long lived and reliable in operation.

In accordance with this invention, a balanced extendible mobile or portable conveyor is provided comprising an elongate wheeled main frame having a pair of oppositely directed retractable frames at opposed ends thereof that are in substantially parallel coplanar relation and that are movable in a balanced synchronized manner inwardly and outwardly of the respective frame ends, with a single belt conveyor trained over the top of the wheeled frame and the ends of the retractable frames that are arranged for automatic slack let out and take up as the retractable frames are extended or retracted to extend or retract the conveyor. The retractable frames are arranged so that they telescope one within the other and both within the main frame as they move toward their retracted positions. The wheeled frame includes a reversible drive for the belt and driving wheels for the main frame for driving and steering purposes.

The conveyor in its retracted relation has the length of the wheeled frame for ready maneuverability and storage, but in use its extendible and retractable end frames may be extended in a balanced synchronized manner to dispose the load carrying run of the belt at a length suitable to move the loads to be carried from a loading position on the dock to a desired unloading position within the vehicle that may be as much as approximately 40 feet. Alternately, its retractable end frames may be independently extended and/or retracted, without affecting operation of the conveyor belt, to suit conditions.

Other objects, uses and advantages will be obvious or become apparent from a consideration of the following detailed description and the application drawings.

In the drawings:

FIG. 1 is a diagrammatic side elevational view of a semi-trailer in the process of being loaded in accordance with the present invention, with the body of the semi-trailer being shown in vertical section;

FIG. 2 is a plan view of the apparatus shown in FIG. 1, with a semi-trailer body shown in horizontal section, and the apparatus of this invention shown in its contracted relation in the full line showing, and in its extended relation in the broken line showing;

FIG. 3 is a side elevational view of the conveyor apparatus, similar to the showing of FIG. 1, but on an enlarged scale, and with parts broken away;

FIG. 4 is a plan view of the conveyor shown in FIG. 3, with the conveyor belt shown at half width to facilitate illustration;

FIG. 5 is a diagrammatic perspective view of the conveyor apparatus, with parts broken away and the conveyor belt and some parts associated therewith omitted to facilitate illustration;

FIG. 6 is a sectional view taken substantially along line 6—6 when the conveyor is in its contracted relation; and FIG. 7 is a diagram illustrating the manner in which the conveyor belt of the conveyor is trained and the operation of the automatic slack take up and let out features of the conveyor, with the belt in the fully contracted relation of the conveyor being indicated by the dashed line showing and the full line showing indicating the belt in the fully extended relation of the conveyor.

However, it is to be understood that the specific drawing illustrations provided are supplied primarily to comply with the requirements of the Patent Laws, and that the invention may have other embodiments that will be obvious to those skilled in the art, and which are intended to be covered by the appended claims.

GENERAL DESCRIPTION

Reference numeral 10 of FIGS. 1 - 4 generally indicates one embodiment of the present invention that is shown being employed for loading mail bags 11 from a loading dock 12 into an end loading highway vehicle 14, which has been illustrated as being in the form of the familiar semi-trailer, although the invention is readily applicable to loading of a wide variety of vehicles.

While the invention is disclosed in connection with the handling of mail bags, as this is one of the areas of application in which the invention is of special significance, it is to be understood that the apparatus 10 is readily adapted for handling packaged goods in general, including goods that are bagged or boxed, and the like.

It is assumed that the mail bag handling installation involved in connection with which the apparatus 10 is being used includes the handling dock 12 (of a post office or the like) that is conventionally provided with a level load support surface 16 and the usual shoulder or end 18 against which the vehicle 14 is backed up for purposes of being loaded at loading bay 13.

It is also assumed that the vehicle 14 may be in the form of the usual body 20 defined by forward end wall 22, top wall 24, side walls 26 and 28, floor 30, and end opening 32 that is customarily closed by suitable doors or the like (not shown). The body 20, being of the semi-trailer type, rides on the usual rear wheels 34, and is provided with the usual king pin 36 for connection to the fifth wheel of a conventional truck tractor (not shown). When disconnected from the truck trailer, vehicle 14 rests on suitable retractable props 39 adjacent its forward end.

Apparatus 10 generally comprises a main or wheeled frame 40 that rides on front wheels 42 and rear wheels 43 and is elongate in configuration defining opposite ends 44 and 46.

The main frame 40 carries a pair of retractable end frames 48 and 50, which are mounted in substantially parallel coplanar relation and are mounted for movement between the retracted positions indicated in FIG. 2 to the extended positions indicated in FIG. 1 to extend the conveyor from its retracted relation shown in the full line showing of FIG. 2 to the extended relation indicated in the full line showing of FIG. 1.

Trained over the main frame 40 and retractable frames 48 and 50 is conveyor belt 52, the upper run 54 of which defines the load supporting surface of the conveyor and is what is extended by the extension of the frames 48 and 50 from their retracted positions. Conveyor 52 is trained over bend pulleys, drive pulleys and the like in the manner indicated in FIG. 7 to accommodate the extension and retraction of the frames 48 and 50 that is contemplated by this invention.

Frames 48 and 50 are moved between their retracted and extended positions by drive mechanisms 56 and 58 (see FIG. 3), respectively, which are arranged to selectively operate independently of each other, or operate at synchronized but reversed speeds so that the frames 48 and 50 move outwardly and inwardly of the wheeled frame 40 in a balanced and synchronized manner. Conveyor belt 52 is driven by drive mechanism 60, which preferably is operable to drive the belt in either direction at the selection of the operator, and at a speed in the range of from about 40 to about 100 feet per minute. The forward wheels 42 are preferably driven, as by each having its own built in hydraulic motor so that by driving the wheels 42 at different speeds, at the selection of the operator, the apparatus 10 can be steered when being moved from place to place. Wheels 43 are of the caster type.

The apparatus 10 is provided with a suitable control panel arrangement where indicated at 62 (see FIG. 1) at which the controls for drive mechanisms 56, 58, 60 and the wheels 42 are located for convenience of operation by the operator in maneuvering the apparatus 10. The retractable frames 48 and 50 each have their own control panels 63 and 65, respectively, for operating same from a position adjacent either end of the apparatus.

The apparatus 10 when not in use may be in the contracted relation shown in full lines in FIG. 2 and suitably stored on the loading platform 12. When a vehicle 14 is to be loaded, the apparatus 10 has its drive wheels 42 operated to move it onto the vehicle, and then its drive mechanisms 56 and 58 operated to extend the conveyor as need be between the loading dock 12 and the location within the vehicle loading area at which the mail bags are to be loaded. Where the vehicle 14 is to be fully loaded from the dock, the apparatus 10 will initially be substantially fully extended to mechanically convey bags 11 to adjacent vehicle end wall 22 for stacking purposes at that location. Suitable conventional bridge plate 66 may be employed to bridge the gap between the vehicle 14 and the loading dock 12.

A conventional hand truck 68 (known in the art as a nutting truck) loaded with mail bags 11 may then be disposed adjacent the extended end 70 of the frame 50 for convenient manual positioning of the mail bags 11 on the conveyor belt 52. When the belt drive mechanism 60 is actuated to move the belt upper run 54 to the left of FIGS. 1 and 2, the bags will be manually applied to and be moved single file fashion, on belt run 54, across the apparatus 10 to the projecting end 72 of retractable frame 48, where a worker standing adjacent the end 72 can grasp the bags as they near end 72 and manually stack them to form a stack 74 of mail bags 11 against the front wall 22 of the vehicle 14. As soon as one hand truck 68 is emptied it is replaced by another hand truck for emptying in the same manner.

When the initial stack 74 is completed up to ceiling height, the extension of the frame 48 is adjusted relative to the vehicle body 14 so that the next adjacent stack 74 (not shown) may be formed and loading proceeds to complete that stack. This is done by the worker who is at end 72 of frame 48 pushing control buttons on control panel 63 that will effect retraction of frame 48 relative to frame 40 and independent of frame 50 (the latter remaining stationary). The further stacks are formed in like manner, with the frame 48 of conveyor 10 being retracted as necessary to permit the formation of new mail bag stacks up to the ceiling of the vehicle. When loading of the vehicle has proceeded to the point where frame 48 is fully retracted, the worker operates other push buttons of control panel 63 that effects operation of wheels 42 to move conveyor 10 to the right of FIGS. 1 – 4, and retract frame 50 as required to keep its end 70 approximately where indicated in FIGS. 1 and 2 relative to the hand truck 68 being unloaded. Loading of the vehicle continues and conveyor 10 moved, and its end frame 50 retracted, in a similar manner as new stacks 74 are completed, until end frame 50 is fully retracted (in which condition, for the illustrated embodiment, the vehicle 14 will be approximately two-thirds loaded). At this point, only the length of the main frame 40 will be necessary to convey the bags 11 from their position of unloading from hand truck 68 to their position of loading within the vehicle 14, the apparatus 10 being moved rearwardly of the vehicle and outwardly on the dock as stacks 74 are completed, to complete the vehicle loading operation.

When loading of the vehicle is completed, the end opening 32 is closed in the usual manner and the vehicle 14 driven off. The apparatus 10 may be then moved to an adjacent loading bay for loading another vehicle 14, or stored or left standing to await the arrival of another vehicle 14 at the bay 13.

SPECIFIC DESCRIPTION

The loading dock 12 that is illustrated is intended to be representative of conventional loading docks now commonly associated with post office installations and the like. The vehicle 14 may be of any standard type, that illustrated intending to represent a typical highway vehicle now in use, though it is to be understood that the invention is equally applicable to other vehicles that are not of the semi-trailer type. Bodies 20 of vehicles 14 may be up to 40 feet in length.

The main or wheeled frame 40 of the apparatus 10 generally comprises upper and lower frame members 80 and 82 on either side thereof which are suitably joined together by vertical frame members 82, 84, 86, 88 and 90, on either side of the frame. At the rear end of frame 40, in the form illustrated outriggers 90 and 92 are illustrated to which are applied the respective casters 43. The outriggers 90 and 92 may be of any suitable structural arrangement and the casters 43 may be of any suitable type.

The main frame has applied between its upper frame members 80 a slider plate 94 which supports the upper run 54 of conveyor belt 52. Closure plates 95 (see FIG. 1) fixed to the frame members of frame 40 and closing off the openings defined by the horizontal and vertical frame members of frame 40 may be employed, though these are omitted from the rest of the drawing figures.

The main frame 40 includes suitable cross members for reinforcing purposes that may be of any suitable type and location, several of which are diagrammatically illustrated in FIG. 5.

Frame 40 supports a pair of spaced apart I beams 100 and 102 (see FIGS. 3 – 5) that each defines on either side of same guideways 104 and 106, with the guideways 104 facing outwardly of the frame 40 while the guideways 106 face inwardly of same and oppose each other. Beams 100 and 102 are of identical construction, and each comprise a web 108 and spaced end flanges 110 and 112, as is typical of beams of the I or H configuration.

In the form illustrated, the beams 100 and 102 have their respective ends 114 and 116 each affixed to the respective mounting plates 118 that are in turn affixed in any suitable manner to the frame members 82 and 80 adjacent same. This may be done by welding or the like. The other ends 120 and 122 of the beams 100 and 102 respectively are free floating relative to the frame 40.

Retractable frame 48 is of box configuration comprising upper and lower plates 130 and 132 (see FIG. 5) separated by channel members 134 and 136 that form the sides of the frame 48 and have their flanges 137 directed outwardly of the frame. Plates 130 and 132 are affixed to the respective channel members 134 and 136 in any suitable manner, as by employing welding or the like. Frame 48 at its end 72 journals end roller 140 over which belt 52 is trained. Frame 48 also journals a bend roller 142 adjacent the other frame end 73. At the end 73 of the frame 48 guide rollers 144 and 146 are journaled in the respective channel members 134 and 136, which guide rollers are respectively received in a respective guideway 106 that are defined by the respective beams 110 and 102, each cooperating with a suitable track structure 148 (see FIG. 6) formed in the respective guideways 106.

The retractable frame 48 is supported from below by its drive assembly 56, which comprises drive roller 150 suitably journaled in frame 40 and that is toothed as at 152 for cooperation with openings 154 formed in the bottom plate 132 of the frame 48 for coupling drive roller 150 thereto in a gear or rack type manner for moving frame 48 relative to frame 40. Drive roller 150 is reversably driven by suitable hydraulic motor 156 (see FIG. 3) that is of the reversable type, through suitable drive chain 158 that is applied over the respective sprockets 160 and 162 that are suitably keyed with respect to the hydraulic motor and drive roller 150, respectively.

In the form shown, guide rollers 144 and 146 are journaled on rod 164 (see FIG. 4) that extends between the side members 134 and 136 of the frame 48.

Frame 50 is also of a box construction similar to that of frame 48, frame 50 comprising upper and lower sheets 170 and 172 spaced apart by channel members 174 and 176 which form the side members of the frame 50, and have their flanges 178 directed inwardly of the frame, as distinguished from the arrangement of frame 48. Frame 50 at its end 70 journals end roller 178 over which the belt 52 is trained, and adjacent its end 71 frame 50 is provided with a pair of depending brackets 180 between which is journaled a bend roller 182 over which the belt 52 is also trained.

Each frame side member 174 and 176 has a plurality of flange type bearing units 184 suitably applied thereto that each journal a support roller 186, with the support rollers 186 being aligned horizontally for reception within the guideways 104 that are defined by the outwardly facing sides of the respective trackway forming beams 100 and 102. Rollers 186 engage the track structures 188 (see FIG. 6) that are formed in their respective trackways 104. In the showing of FIG. 6, bearing units 184 are omitted to simplify the drawing.

Frame 50 is supported from below by its power drive device 58, which comprises drive roller 190 that is suitably journaled on the main frame 40 and provide with teeth 192 similar to teeth 152, and having a similar spacing, for gearing type cooperation with openings 194 formed in the bottom plate 172 of frame 50. Drive roller 190 is reversably driven by suitable reversable hydraulic motor 196 that is suitably coupled with drive roller 190 through a suitable drive chain 196 engaging the sprockets 198 and 200 that are respectively and suitably keyed to the motor 196 and drive roller 190, respectively.

The hydraulic motors 160 and 198 may be powered in any conventional manner, but in accordance with this invention, they are hydraulically arranged in a convenient manner to operate either independently, for movements of the respective end frames 48 and 50 independently of each other, or at equal but reverse speeds so that frames 48 and 50 move synchronously but in opposite directions. Control panels 62, 63 and 65 may be arranged in any suitable manner to achieve this end by an operator stand-ing adjacent any one of these panels.

The belt drive mechanism 60 comprises drive roller 210 suitably journaled in frame 40 and powered by a suitable driving motor 212 through a drive chain of the step down type comprising drive chains and sprockets of the general type suggested in the drawings, although any suitable arrangement will be satisfactory that will drive the belt 52 at a speed lying in the range of from about 40 to about 100 feet per minute in either direction, depending on conditions.

Operably associated with the belt 52 is suitable take up mechanism 220 which comprises bend roller 222 suitably journaled in the frame 40 and take up pulley 224 journaled between suitable take up bearings 226 that are suitably mounted for adjustment relative to frame 40 between the two position showing for take up roller 224 that is indicated in FIG. 3. Take up bearings 226 thus may be of the type made and sold under the trademark SEALMASTER of the Morse Chain Division of Borg-Warner Corporation.

Take up bearings of this type ordinarily include a track 225 on which the bearings 226 are mounted and a screw coupled to same for adjusting the bearings longitudinally of the frame 40 to provide the tension on the belt that is desired, as is well known in the conveyor arts.

As indicated in FIGS. 3 and 7, belt 52 in extending from end pulley 140 of frame 48 proceeds about bend roller 142 that is carried by frame 48, and thence about suitable bend rollers 230 and 232 that are suitably journaled in frame 40, then into and through take up device 220 by being trained about take up roller 224 and bend roller 222. The belt proceeds from take up device 220 over suitable bend roller 234, then about drive roller 210, then roller 182, and bend roller 236 that is suitably journaled in frame 50, for return about end roller 178, then across the slider plate surfaces that are provided by the plates 94, 130, and 170 of the respective frames 40, 48 and 50.

Actuation of drive mechanism 60 moves belt 52 in the direction dictated by the direction of drive of motor 212; as indicated, motor 212 is preferably of the reversable type so that belt movement can also be in the opposite direction.

A schematic diagram of the belt training arrangement is indicated in FIG. 7, from which it will be seen that the bend rollers 142 and 182 carried by the respective frames 48 and 50 form slack take up half loops where indicated at 250 and 252 respectively, which half loops are extended and retracted as the frames 48 and 50 are extended and retracted with respect to the frame 40. Thus, the rollers 140 and 142, which are carried by frame 48, have the relative positioning indicated in the dashed lines in FIG. 7, and move to the position indicated in full lines in FIG. 7 as frame 48 moves to its fully extended position; similarly, rollers 178 and 182, which are carried by frame 50, have the initial position indicated in dashed lines in FIG. 7 in the retracted position of frame 50, but move to the full line position as the frame 50 approaches its extended position. These relative movements may be in equal but opposite directions but also may be independently of each other, and the half loops 250 and 252 automatically let out and take up the required amount of belt slack that is commensurate with the changing length of the load supporting surface 54 of the belt 52 due to change of positions of the respective frames 48 and 50 relative to frame 40. In this connection, it is to be noted that the slack take up of one of the frames 48 or 50 is not affected by the movement, or lack of same, of the other frame relative to frame 40.

It will also be observed from FIGS. 3 – 5 that frames 48 and 50 not only telescope within the frame 40 in moving toward their retracted relation, but also frame 48 telescopes within the frame 50. The track way forming beams 100 and 102 are supported by the drive roller 192 through support of frame 50 by that member. The guide rollers 186 of frame 50 are spaced so that in the extended position of this frame at least two of these guide rollers 186 on each side of the frame 50 will remain in the respective guideways 104. Suitable stop elements 260 affixed to the side members 134 and 136, respectively, of the frame 48 that engage with the inwardly directed edges of plates 118 serve to limit the outward extending movement of the frames 48 and 50. The frame 50 carries stops 263 cooperating with stop plates 265 of the ends of frame members 80.

Powered wheels 42 may be of any suitable type, those shown comprising a hydraulically driven wheel device 270 comprising wheel rim 272 journaled on a hydraulic drive mechanism 274 suitably fixed to frame 40 and powered hydraulically to drive the rims 272 in either direction, as desired. Hydraulic mechanism is powered from a suitable power unit 276 carried by the frame 40 for that purpose. As indicated, wheels 42 are preferably arranged so that they are independently driven and can be operated at varying speeds for steering and speed control purposes.

The controls for operating the power drives 56, 58 and 60, and power wheels 42 may be conveniently applied at any one of control panels 62, 63 and 65 for operation by an operator standing adjacent a convenient control panel. Panels 63 and 65 are positioned so that they will be exposed when frames 48 and 50 are in their retracted positions.

In utilizing the conveyor 10, it is preferable to have a two man crew so that bags 11 can be loaded from the apparatus 10 as they are being applied to same from hand truck 68. However, one man can operate the apparatus 10 by first loading up the conveyor 10 with bags from hand truck 68, and then walking to the other end of the apparatus 10 to unload the bags on conveyor 10 to form the stacks 74.

It will therefore be seen that this invention provides a conveyor apparatus for handling mail bags as well as other packaged goods that has mobility, steerability, and balanced extensibility for general purpose use. In one specific embodiment of the invention, the conveyor is fifteen feet in length between rollers 140 and 178, in a contracted relation of same, and can be extended to a length of 37½ feet. The balanced nature of the device contributes to its mobility and facility in handling, and the same unit can service a single loading bay, or a number of loading bays for the same loading dock, by appropriately maneuvering the apparatus as desired. When not in use the conveyor may be disposed in its contracted relation and stored in an out of the way position. As indicated, the retractable end frames may be moved independently of each other, or in equal but reversed directions in a synchronized manner. This flexibility simplifies its use and expedites handling of mail bags and the like.

It is contemplated that the basic driving mechanisms of the apparatus will be powered by electric motors, but of course other power units may be employed where so desired.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A mobile conveyor apparatus comprising:
   a wheeled main frame having oppositely directed ends,
   said frame having a pair of oppositely directed retractable rectilinear frames each defining an end directed outwardly of said main frame,
   with one of said retractable frames being at one of said main frame ends and the other of said retractable frames being at the other main frame end,
   said retractable frames being horizontally disposed and in substantially coplanar relation,
   said retractable frames each being mounted for movement longitudinally thereof along said main frame between a retracted position disposed substantially within said main frame and an extended position extending cantilever fashion outwardly of said main frame a major portion of the respective lengths thereof,
   said retractable frames being formed to telescope within said main frame when said retractable frames are in their retracted positions,
   an endless conveyor belt having an upper run trained over the tops of said frames and said main frame and between said ends of said retractable frames in tensioned relation thereover to provide an upwardly facing load transport surface extending over said apparatus and between said retractable frame ends,
   means for reversably driving said belt lengthwise of said surface,
   means for selectively moving said retractable frames between their respective retracted and extended positions to retract and extend said load transport surfaces relative to said ends of said main frame, respectively,
   and means for effecting automatic take up and let out of said belt adjacent said ends of said main frame and within said main frame to accommodate said movement of said retractable frames between their said positions while maintaining tension in said belt and effecting extension and contraction of said load transport surface.

2. The apparatus set forth in claim 1 wherein:
   said means for moving said retractable frames comprises:
   power operated mechanical means for selectively synchronously or independently moving said retractable frames between their respective positions.

3. The apparatus set forth in claim 1 wherein:
   said means for effecting take up and let out of said belt comprises:
   each end of said main frame having a bend roller journaled on said main frame below the respective retractable frames,
   each of said retractable frames having journaled thereon a bend roller adjacent the respective other ends thereof,
   said belt being trained over said bend rollers to define a belt take up loop under each of the respective retractable frames for automatic take up and let out of slack in said belt on said retractable frames being moved between said positions thereof.

4. The apparatus set forth in claim 2 wherein said power operated means comprises:
   said main frame adjacent each of said ends thereof having journaled thereon a drive roller on which the respective retractable frames rest,
   motor means for reversably driving said drive rollers,
   and means for coupling the respective drive rollers to the respective retractable frames.

5. The apparatus set forth in claim 4 including:
   a pair of track members carried by said main frame extending longitudinally of said retractable frames on which said retractable frames are mounted,
   said track members each comprising:
   a beam defining a trackway on either side of same,
   said beams being in substantially parallel, coplanar relation,
   one of said retractable frames riding on the trackways of said beams that face each other,
   and the other of said retractable frames riding on the other trackways of said beams,
   said beams being supported on said main frame by being cantilevered on said main frame adjacent like ends of said beams and adjacent one of said main frame ends,
   with the drive roller at the other end of said main frame supporting said beams by the retractable frame that is driven by same resting on same.

* * * * *